Patented Nov. 10, 1953

2,658,897

UNITED STATES PATENT OFFICE 2,658,897

2,4-DIAMINO-5-BENZYL PYRIMIDINES

George H. Hitchings, Tuckahoe, and Elvira A. Falco, New Rochelle, N. Y., assignors to Burroughs Wellcome & Co. (U. S. A.) Inc., Tuckahoe, N. Y., a corporation of New York No Drawing. Application June 27, 1951, Serial No. 233,951

6 Claims. (Cl. 260—256.4)

The present invention relates to a new class of 5-benzyl-2,4-diaminopyrimidines of the formula

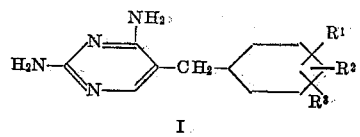

I wherein $R^1$ is a radical selected from the class consisting of the lower alkoxy radicals and the phenyl radical, $R^2$ is a radical selected from the class consisting of the lower alkoxy radicals and hydrogen and $R^3$ is selected from the class consisting of hydrogen, and the halogens and the nitro groups when $R^1$ is alkoxyl. This application is a continuation-in-part of our co-pending U. S. application 161,256, filed May 10, 1950, now Patent No. 2,624,732.

These substances are characterized by exceptionally high antibacterial activities which fit them for surface application to wounds. Certain of them also maintain their activity in the presence of body fluids and may therefore be of value for the treatment of systemic infections.

The preparation of these substances involves the synthesis of a suitable hydrocinnamic ester (I), which is formylated (II) and condensed with guanidine to give a 2-amino-4-hydroxypyrimidine (III). Subsequent conversion to the diamino compound takes place readily by chlorination and amination, or by thiation

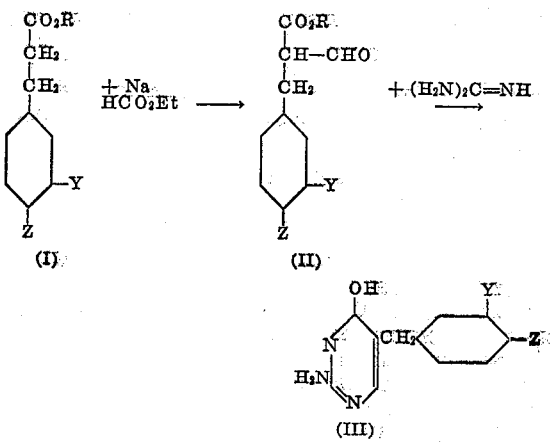

and amination as described in our cognate applications, Serial Numbers 33,677 and 33,678, both now abandoned, in conjunction with the method of U. S. Patent No. 2,415,793 to Hitchings and Elion.

As a variant, a hydrocinnamic nitrile may be formylated and the resultant hydroxy methylene hydrocinnamic nitrile may be converted to an alkoxymethylene derivative (enol-ether) which is then cyclized with guanidine directly to give the desired 2,4-diamino-5-benzyl pyrimidine. This alternative synthesis follows the course shown below.

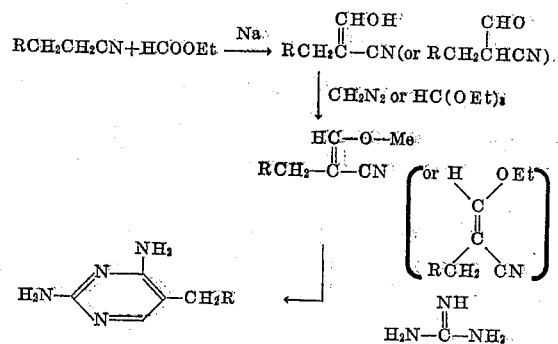

(wherein $CH_2R$ is the 5-benzyl group of Formula I).

The following examples will serve to illustrate the teachings of our discovery, but are not to be regarded as limiting the invention except as defined in the accompanying claims.

EXAMPLE 1

*2,4-diamino-5-(2'3'-dimethoxybenzyl) pyrimidine*

A. *2 - amino - 4 - hydroxy - 5 - (2'3' - dimethoxybenzyl) pyrimidine.*—To 90.4 g. of ethyl-2,3-dimethoxyhydrocinnamate (0.38 mole) was added 30 g. of ethyl formate (0.40 mole) and this was poured onto 8.7 g. of sodium wire (0.38 mole) in 500 ml. of sodium dried ether. After standing 72 hours the ether was evaporated off and the guanidine from 37 g. of guanidine hydrochloride (0.38 mole) and 8.7 g. of sodium in 300 ml. of ethanol was filtered into the reaction mixture. The mixture was refluxed for 8 hours on the steam bath, poured into about 2 liters of water and neutralized with acetic acid. The crude precipitate was collected; it weighed 25 g. after washing with water and ether.

B. 15 g. (0.57 mole) were refluxed with 1.50 ml. of phosphorous oxychloride for one-half hour. The excess reagent was taken off in vacuo and the residue decomposed by pouring over 200 g. of ice. This was made alkaline with ammonium hydroxide to pH 9 and filtered. The crude chloro compound was sucked dry and placed in a bomb with 200 ml. of saturated (10°) ethanolic ammonia. The bomb was heated 16 hours at a temperature of 160°, opened and the alcohol evaporated on the steam bath. The residue was taken up in dilute acetic acid and precipitated by the addition of sodium hydroxide to pH 10. The resulting precipitate was filtered and recrystallized from 95 percent ethanol to give 5.7 g. of white crystalline material having an M. P. of 193–197°.

EXAMPLE 2

2,4-diamino-5-(3'4-dimethoxybenzyl) pyrimidine

A. 2 - amino - 4 - hydroxy - 5 - (3'4' - dimethoxybenzyl) pyrimidine. — This compound was prepared in the same manner as Example 1-A by the addition of 60 g. of ethyl-3'4'-dimethoxyhydrocinnamate and 20.6 g. of ethyl formate to 5.8 g. of sodium wire in ether to give the crude sodium formyl compound which was condensed with 24.2 g. of guanidine hydrochloride in 5.8 g. of sodium in alcohol. The crude amino-hydroxy compound thus obtained melted at 230–237°.

B. *The preparation of the 2,4-diamino-5-3'4'-dimethoxybenzyl) pyrimidine.*—This compound was prepared in the same manner as Example 1-B. The amino-hydroxy compound was converted to the amino-chloro compound by means of phosphorous oxychloride, the crude chloro compound was then heated with alcoholic ammonia at 150° to give 2,4-diamino-5-(3'4-dimethoxybenzyl)-pyrimidine. This melts at 224–229° after recrystallization by solution in dilute acetic acid and precipitation with alkali at pH 10.

EXAMPLE 3

2,4-diamino-5-p-methoxybenzylpyrimidine

The aminohydroxy compound was prepared in the usual manner from ethyl-p-methoxy-hydrocinnamate. It was converted by means of phosphorous oxychloride and subsequent amination to 2,4-diamino-5-p-methoxybenzylpyrimidine melting at 198–202°, in white micro needles from 95 percent ethanol.

EXAMPLE 4

2,4 - diamino - 5-(3'ethoxy - 4' - methoxybenzyl) pyrimidine

A. *Preparation of 2-amino-4-hydroxy-5-(3'-ethoxy-4'-methoxybenzyl) pyrimidine.*—Ethyl-3-ethoxy-4-methoxyhydrocinnamate (40.0 g., 0.16 mole) and 14.0 g. (0.19 mole) of ethyl formate with 3.7 g. of sodium wire (0.16 mole) were treated as described in the previous example. The product was condensed with guanidine as in Example 1-A. The yield was 17 g. of the aminohydroxypyrimidine.

B. *Preparation of 2,4-amino-5-(3'-ethoxy-4'-methoxybenzyl) pyrimidine.*—From 10 g. of the above compound by treatment with phosphorous oxychloride followed by ammonia as in Example 1-B there was prepared 3.0 g. of the required compound which melted at 197–198° C.

EXAMPLE 5

2,4-diamino-5-(3'4'-diethoxybenzyl) pyrimidine

A. *Preparation of 2-amino-4-hydroxy-5-(3'4'-diethoxybenzyl) pyrimidine.*—From 70 g. (0.263 mole) of ethyl-3,4-diethoxyhydrocinnamate was prepared 28.0 g. of the amino-hydroxy compound following the procedure outlined in Example 1-A.

B. Preparation of 2,4-diamino compound from the above followed the usual procedure outlined for 1-B. From 20.0 g. of the amino-hydroxy compound was prepared 2.8 g. of the diamino compound melting at 185–188°.

EXAMPLE 6

2,4-diamino-5-(3'4'-dimethoxy-(6 or 1 nitro) benzyl pyrimidine)

To 3.0 g. of 2,4-diamino-5-(3'4'-dimethoxybenzyl)-pyrimidine (described in Example 2) dissolved in 40 ml. of glacial acetic acid was added 2.16 ml. of nitric acid (sp. gr. 1.4) in 3 portions over ½ hour, with stirring, keeping the temperature at 15° C. The mixture was then stirred an additional ½ hour at which point the temperature had risen to 30°. The mixture was then poured over 300 g. of cracked ice and brought to pH 10 with concentrated ammonium hydroxide solution. After standing an hour the precipitate was filtered off and washed with cold water. The precipitate was then recrystallized from 95 percent ethanol in pale yellow needles melting at 200–203°. The yield was 2.7 g.

EXAMPLE 7

2,4 - diamino - 5 - (3' - methoxy - 4' - propoxybenzyl) pyrimidine

The aminohydroxy compound was prepared in the usual manner from ethyl-3-methoxy-4-propoxyhydrocinnamate. It was treated in the usual manner with phosphorous oxychloride followed by alcoholic ammonia to give the desired 2,4-diamino-5-(3'-methoxy-4'-propoxy) benzyl pyrimidine melting at 178–179°.

EXAMPLE 8

2,4 - diamino - 5 - (2' - methoxy - 5' - chlorobenzyl) pyrimidine

The aminohydroxy compound was prepared in the usual manner from ethyl-2-methoxy-5-chlorohydrocinnamate. From 26 g. (0.11 mole) ester there was obtained 7.0 g. of aminohydroxy pyrimidine melting at 278–284°. From 6.0 g. of the aminohydroxy compound by the procedure outlined in Example 1-B there was obtained 3.2 g. of the desired 2,4-diamino-5-(2'-methoxy-5-chloro) benzyl pyrimidine melting at 169–171°.

EXAMPLE 9

2,4-diamino-5-(3'4'-dimethoxy-5'-bromobenzyl) pyrimidine

From 24.0 g. (0.07 mol) of ethyl-3,4-dimethoxy-5-bromohydrocinnamate was prepared 16.0 g. of the desired aminohydroxy compound by the usual procedure. This compound (10 g.) was chlorinated and aminated in the usual manner to give 3.0 g. of the 2,4-diamino-5-(3'4'-dimethoxy-5'-bromobenzyl) pyrimidine melting at 198–201°.

EXAMPLE 10

2,4-diamino-5-p-phenylbenzylpyrimidine

The aminohydroxy compound (20.0 g.) was prepared from 23 g. of ethyl-p-phenyl-hydrocinnamate by the usual procedure. Fifteen grams of the aminohydroxy compound after treatment with phosphorous oxychloride followed by ammonia gave 8.0 g. of the desired 2,4-diamino-5-p-phenylbenzyl pyrimidine melting at 250–258°.

Since the base is the physiologically active moiety in any non-toxic salt of any compound described herein, the known non-toxic salts of these derivatives are regarded as the equivalent of the uncombined bases described in the specification and claims herein.

We claim:
1. A compound of the formula

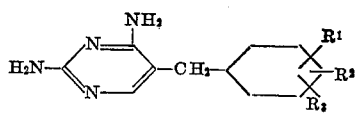

wherein $R^1$ is a radical selected from the class consisting of the lower alkoxy radicals and the phenyl radical, $R^2$ is a radical selected from the class consisting of the lower alkoxy radicals and hydrogen and $R^3$ is selected from the class consisting of hydrogen and, when $R^1$ is a lower alkoxy radical, of chlorine, bromine and the nitro groups.

2. 2,4-diamino-5-(3'4'-diethoxybenzyl) pyrimidine.

3. 2,4-diamino-5-(3'4'-dimethoxybenzyl) pyrimidine.

4. 2,4 - diamino - 5 - (3' - ethoxy - 4' - methoxybenzyl) pyrimidine.

5. 2,4 - diamino - 5-(3' - methoxy - 4' - propoxybenzyl) pyrimidine.

6. 2,4 - diamino - 5(3'4' - dimethoxy - 5' - bromobenzyl) pyrimidine.

GEORGE H. HITCHINGS.
ELVIRA A. FALCO.

No references cited.